May 30, 1944.    E. E. SIMMONS, JR    2,350,072

TORQUE MEASURING APPARATUS

Original Filed Feb. 23, 1940

INVENTOR
Edward E. Simmons, Jr.
BY
ATTORNEY

Patented May 30, 1944

2,350,072

UNITED STATES PATENT OFFICE 2,350,072

TORQUE MEASURING APPARATUS

Edward E. Simmons, Jr., Pasadena, Calif.

Original application February 23, 1940, Serial No. 320,327. Divided and this application January 1, 1942, Serial No. 425,358

5 Claims. (Cl. 265—1)

This invention relates generally to force measuring apparatus particularly for torque.

It is an object of my invention to provide improved means whereby the torque of a shaft may be measured with a high degree of sensitivity and accuracy in a simple and direct manner. A further object is to provide improved torque measuring apparatus in which the force responsive element is subjected directly to a tension load without involving complications incident to diagonal tension stresses in a shaft. A further object is to provide an improved torque measuring apparatus that can, if desired, be employed in connection with a rotary type impact testing machine wherein a specimen may be broken without impairing the operativeness of the torque measuring apparatus.

Figure 2:
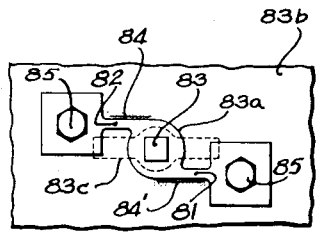
Figure 1:
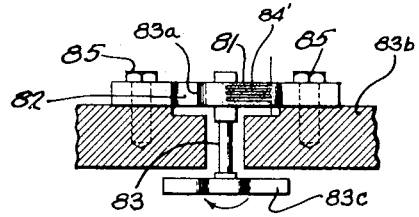

Other objects and advantages will be more apparent to those skilled in the art from the following description of the accompanying drawing in which:

Fig. 1 is a diagrammatic sectional illustration of a torsional dynamometer employing my invention; and Fig. 2 is a plan view of Fig. 1.

Torsional impact machines of a well-known type employ a specimen one end of which is normally held against rotation and the other end of which is free to rotate upon application of a sudden torsional impact load applied thereto, such a machine being shown for example in Luerssen et al. Patent No. 1,962,604.

To measure the torsional load imposed upon a specimen 83, I suitably clamp or support the same as by a squared end on the specimen shank in an S-shaped strain responsive member 83a which in turn, is bolted at 85 or otherwise suitably secured to a stationary frame 83b. The free end of the specimen 83 is provided with a usual strike bar 83c extending crosswise of the specimen axis. This cross bar may be hit in any desired manner, for example, as shown in said Patent No. 1,962,604 whereby torque is imparted to the specimen. Strain sensitive filaments are applied at 84 and 84′ to the relative thin tangential sides or arms 81 and 82 of the S member so as to act in tension for an application of torque to the square ended specimen. The strain sensitive filamen. are more fully disclosed in my copending application Serial No. 320,327 filed February 23, 1940, now Patent No. 2,292,549, granted Aug. 11, 1942, of which this present application is a division. Hence the filaments need only be briefly described herein as consisting of a very fine metallic wire continuously solid throughout its length and whose electrical strain characteristics are predetermined. This wire may be of suitable and well-known material such as "Constantan," "Advance" and various other well-known materials having good resistance properties as well as being capable of fabrication in small wire sizes. The filament is preferably used in sizes of from approximately .001 to .003 of an inch in diameter. The filament is suitably bonded throughout its effective length and insulated from the oppositely extending legs of the S-shaped strain responsive member 83a by suitable bonding material such as "Glyptal." The change in resistance of the filament in response to changes in strain thereof may be measured by any usual Wheatstone bridge employing an oscillograph if necessary, such as is more fully disclosed in my said copending application but which does not constitute a part of my present invention.

In operation, a rotary impact load is imparted to crosshead 83c which will twist specimen 83 in a clockwise direction when looking down on Fig. 2 thereby to subject two legs of the S-shaped member 83a to a tension stress for resisting rotation of the upper fixed end of the specimen. The strain imposed by the foregoing tension load in the S member will correspondingly strain the fillaments 84 and 84′. Of course if the torque is applied in an opposite direction then the dynamometer arms or legs will be subjected to compression strains and measured by the filaments in the same manner as for tension.

From the disclosure herein, it is seen that I have provided an extremely simple, positive and effective means for measuring the torsional impact stress applied to a specimen which is often applied within a small fraction of a second and hence it has heretofore been difficult if not impossible to determine the actual torsional load transmitted to the specimen to produce failure thereof. My improved dynamometer is adapted to be a permanent part of the impact testing machine because the specimen can be ruptured without injuring or impairing the operativeness of the S-shaped dynamometer. While I have specifically shown my torsional dynamometer for use with a torsional impact machine, yet it will of course be understood that the principles of my torsional dynamometer may be employed under other circumstances and in other machines.

It will of course be understood that various changes in details of construction and arrangement of parts may be made by those skilled in the art without departing from the spirit of the invention as set forth in the appended claims.

I claim:

1. A torsional dynamometer comprising, in combination, a member adapted to have torque transmitted thereto, a rigid arm of fixed length connected to said member substantially tangentially thereof, an end of said arm being anchored to resist torsional movement of said member, and an electrical strain sensitive filament bonded throughout its effective length to said arm so as to be responsive to the strain induced therein by the torsional force.

2. A torsional dynamometer comprising, in combination, a member adapted to have torque transmitted thereto, an arm connected substantially tangentially to said member, an end of said arm being anchored for resisting torsional movement thereof whereby said arm is subjected to a straight line stress, and an electrical strain sensitive filament bonded throughout its effective length to said arm and extending in a direction lengthwise thereof so as to be subject to strains in the arm induced by the straight line stress thereof.

3. A torsional dynamometer comprising, in combination, an S-shaped member having a central specimen engaging body portion, the oppositely extending legs of said member being anchored to resist torsional movement of said body portion when torque is applied to the specimen, and a strain sensitive filament bonded throughout its effective length to a leg of said S member in a direction lengthwise of the leg so as to be responsive to the lengthwise stress induced therein by said torque.

4. A torsional dynamometer comprising, in combination, a member adapted to have torque transmitted thereto, a rigid arm of fixed length connected to said member substantially tangentially thereof, an end of said arm being anchored to resist torsional movement of said member, and strain responsive means secured to said arm so as to be responsive to the strain induced therein by the torsional force.

5. A torsional dynamometer comprising, in combination, an S-shaped member having a central specimen engaging body portion, the oppositely extending legs of said member being anchored to resist torsional movement of said body portion when torque is applied to the specimen, and strain responsive means secured to a leg of said S member so as to be responsive to the lengthwise stress induced in such leg by said torque.

EDWARD E. SIMMONS, Jr.